United States Patent [19]

Burke

[11] 4,085,369
[45] Apr. 18, 1978

[54] VEHICLE RADIO MOUNTING DEVICE

[75] Inventor: Harry W. Burke, Wright, Minn.

[73] Assignee: The Raymond Lee Organization, Inc., New York, N.Y. ; a part interest

[21] Appl. No.: 742,797

[22] Filed: Nov. 18, 1976

[51] Int. Cl.² .................. A47B 96/06; E05B 73/00
[52] U.S. Cl. ...................... 325/312; 70/58; 248/203; 224/42.25
[58] Field of Search .............. 325/312, 352, 353, 16, 325/111, 119; 224/29 K, 29 L, 29 J, 29 G, 29 R, 29 H, 42.41, 42.43, 42.44, 42.46 R, 42.45 R, 42.06, 42.07, 42.1 F, 42.1 G, 42.12, 42.13, 42.25; 292/259, DIG. 2; 200/42 R, 42 T, 45; 248/203; 70/58, 57

[56] References Cited

U.S. PATENT DOCUMENTS

| 1,801,228 | 4/1931 | Edhlund | 200/42 R |
|---|---|---|---|
| 3,036,749 | 5/1962 | Evans | 224/42.32 |
| 3,087,118 | 4/1963 | Goffstein | 325/312 |
| 3,266,725 | 4/1966 | Campbell | 224/42.32 |
| 3,370,446 | 2/1968 | Francis | 70/58 |
| 3,410,122 | 11/1968 | Moses | 70/58 |
| 3,563,070 | 2/1971 | Earl | 70/58 |
| 3,673,828 | 7/1972 | Jones | 70/58 |
| 3,945,227 | 3/1976 | Reiland | 70/58 |
| 3,965,705 | 6/1976 | Nadler | 70/58 |
| 4,006,324 | 2/1977 | Leasher et al. | 200/42 T |
| 4,024,737 | 5/1977 | McInturff | 70/58 |
| 4,038,843 | 8/1977 | Daley, Jr. | 70/58 |
| 4,047,676 | 9/1977 | Porter | 70/58 |

FOREIGN PATENT DOCUMENTS 558,371    5/1943    United Kingdom ............ 70/58

Primary Examiner—Robert L. Griffin
Assistant Examiner—Tommy P. Chin
Attorney, Agent, or Firm—Daniel Jay Tick

[57] ABSTRACT

A rectangular U-shaped mounting bracket is affixed to the bottom of the dashboard of a vehicle and has bores formed through its spaced parallel arms. A radio is swively mounted in the bracket via pins extending through the bores of the arms. A rectangular U-shaped securing bracket has flange parts extending away from each other from each of its spaced parallel arms. The securing bracket is hingedly affixed at one flange part to the bottom of the dashboard so that it is secured with the arms of the securing bracket parallel to and closely spaced from the arms of the mounting bracket whereby the pins are prevented from withdrawal by the arms of the securing bracket. The other flange part of the securing bracket is releasably locked to the dashboard.

2 Claims, 2 Drawing Figures

VEHICLE RADIO MOUNTING DEVICE

BACKGROUND OF THE INVENTION

The present invention relates to a vehicle radio mounting device. More particularly, the invention relates to a vehicle radio mounting device for mounting a radio in an automotive vehicle having a dashboard.

Objects of the invention are to provide a vehicle radio mounting device of simple structure, which is inexpensive in manufacture, installed with facility, convenience and rapidity in new and existing automotive vehicles, and functions efficiently, effectively and reliably to mount a radio in the vehicle for use, as desired, and secure such radio from theft.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The vehicle radio mounting device of the invention mounts a radio in an automotive vehicle having a dashboard 1 with a bottom 2.

Figure 1:
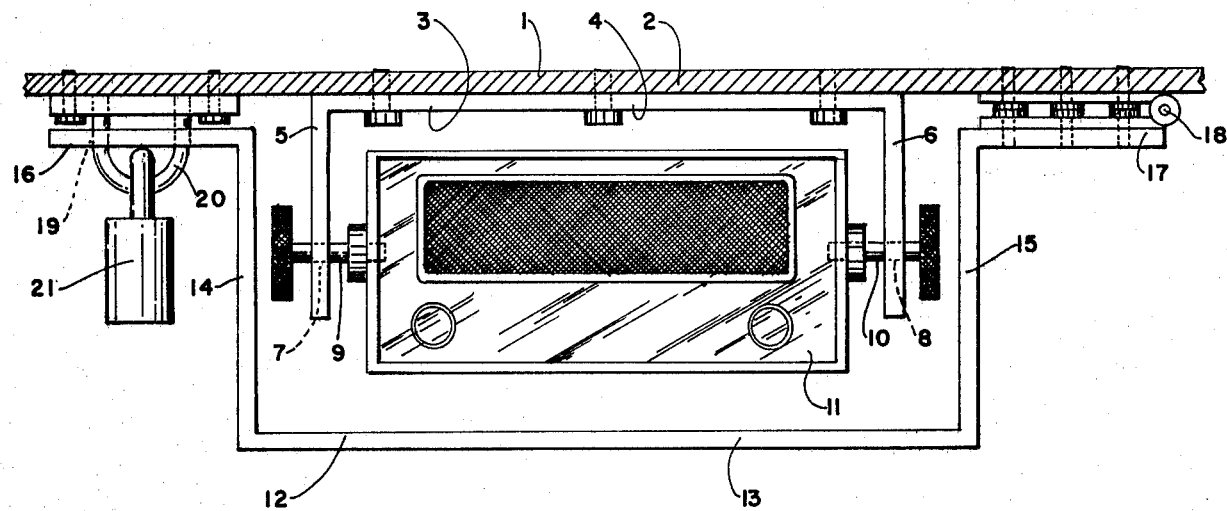
FIG. 1 is a front view, partly in section, of an embodiment of the vehicle radio mounting device.
Figure 2:
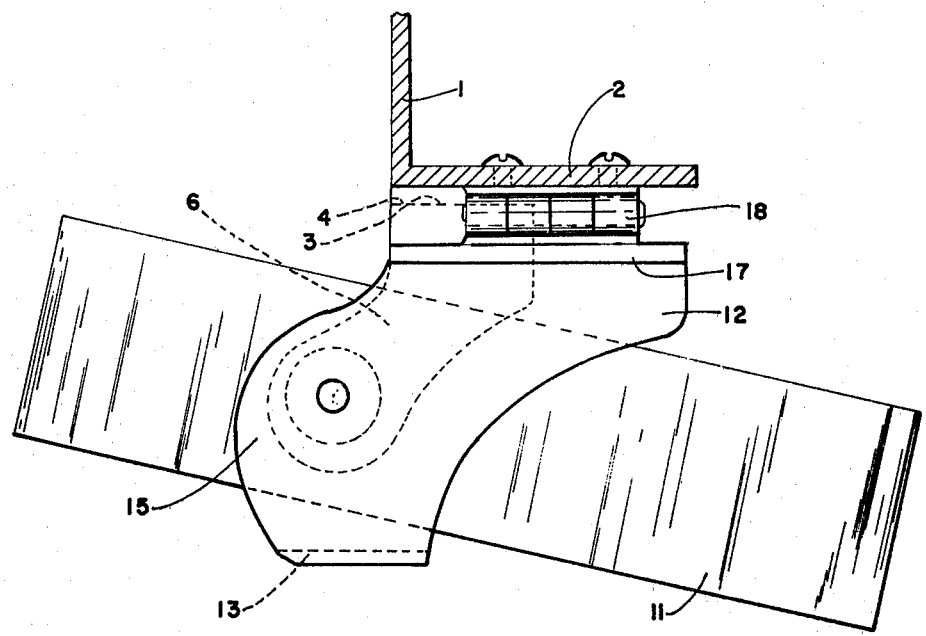
FIG. 2 is a side view, partly in section, of the embodiment of FIG. 1.

The vehicle radio mounting device of the invention comprises a substantially U-shaped mounting bracket 3 affixed to the bottom 2 of the dashboard 1 of the vehicle. The mounting bracket 3 has head 4 affixed to the dashboard and a pair of spaced parallel arms 5 and 6 (FIG. 1) extending perpendicularly from the head. The arms 5 and 6 have bores 7 and 8, respectively, formed therethrough.

Pins 9 and 10 (FIG. 1) extend through the bores 7 and 8 of the arms 5 and 6 of the mounting bracket 3 and swivelly mount a radio 11 in said mounting bracket. The radio 11 may comprise any mobile radio unit, and especially a CB. A substantially rectangular U-shaped securing bracket 12 has a head 13 and a pair of spaced parallel arms 14 and 15 (FIG. 1) extending perpendicularly from the head. A pair of flange parts 16 and 17 (FIG. 1) each extending away from the other, extend from the arms 14 and 15, respectively, at the free edges thereof substantially parallel to the head 13.

A hinge device 18 hingedly affixes the securing bracket 12 to the bottom 2 of the dashboard 1 at the flange part 17 with the arms 14 and 15 of the securing bracket parallel to, and closely spaced from, the arms 5 and 6, respectively, of the mounting bracket 3. The pins 9 and 10 are thus prevented from withdrawal by the arms 14 and 15 of the securing bracket 12.

A locking device is provided for locking the flange part 16 of the securing bracket 12 to the bottom 2 of the dashboard 1 to prevent unauthorized movement of the securing bracket. The locking device comprises a slot 19 (FIG. 1) formed through the flange part 16 and hasp 20 affixed to the bottom 2 of the dashboard and extending through said slot for accommodating a padlock 21.

While the invention has been described by means of a specific example and in a specific embodiment, I do not wish to be limited thereto, for obvious modifications will occur to those skilled in the art without departing from the spirit and scope of the invention.

I claim:

1. A vehicle radio mounting device for mounting a radio in an automotive vehicle having a dashboard with a bottom, said vehicle radio mounting device comprising a substantially rectangular U-shaped mounting bracket affixed to the bottom of the dashboard of a vehicle, said mounting bracket having a head affixed to the dashboard and a pair of spaced parallel arms extending perpendicularly from the head, said arms having bores formed therethrough;

pin means extending through the bores of the arms of the mounting bracket and swivelly mounting a radio in said mounting bracket;

a substantially rectangular U-shaped securing bracket having a head, a pair of spaced parallel arms extending perpendicularly from the head of the securing bracket and a pair of flange parts each extending away from the other from a corresponding one of the arms of the securing bracket at the free edges thereof substantially parallel to the head of the securing bracket;

hinge means hingedly affixing the securing bracket to the bottom of the dashboard at one of the flange parts with the arms of the securing bracket parallel to and closely spaced from the arms of the mounting bracket whereby the pin means are prevented from withdrawal by the arms of the securing bracket; and locking means for locking the other of the flange parts of the securing bracket to the bottom of the dashboard to prevent unauthorized movement of the securing bracket.

2. A vehicle radio mounting device as claimed in claim 1, wherein said locking means comprises a slot formed through the other of the flange parts and a hasp affixed to the bottom of the dashboard and extending through the slot for accommodating a padlock.

* * * * *